July 16, 1929.  N. E. JOHNSON  1,721,155
PACKING AND METHOD OF MAKING
Filed June 26, 1924  3 Sheets-Sheet 1

Witnesses:
W. F. Kilroy
Harry E. White

Inventor:
Norman E. Johnson

Witnesses:
W. L. Kilroy
Harry C. L. White

Inventor:
Norman E. Johnson
By Hiee & Hiee
Attys.

July 16, 1929.　　　N. E. JOHNSON　　　1,721,155
PACKING AND METHOD OF MAKING
Filed June 26, 1924　　　3 Sheets-Sheet 3
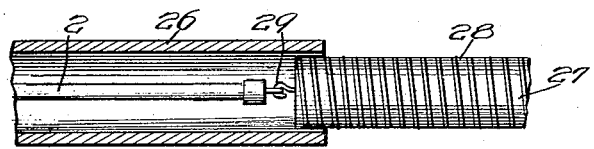
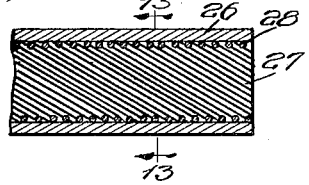
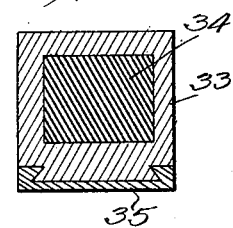
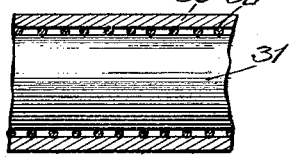
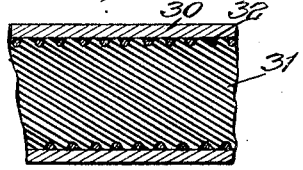
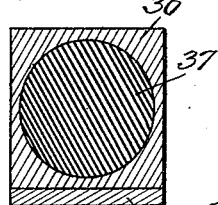
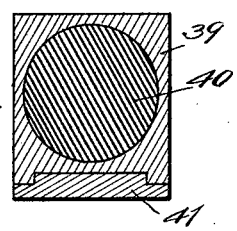
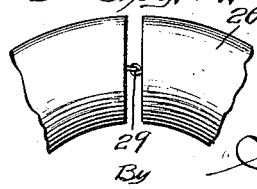
Witnesses:
W. F. Kilroy
Harry B. White
Inventor.
Norman E. Johnson
By
Attys.

Patented July 16, 1929.

1,721,155

UNITED STATES PATENT OFFICE.

NORMAN E. JOHNSON, OF CHICAGO, ILLINOIS, ASSIGNOR TO CHICAGO RHOPAC PRODUCTS COMPANY, OF CHICAGO, ILLINOIS, A CORPORATION OF ILLINOIS.

PACKING AND METHOD OF MAKING.

Application filed June 26, 1924. Serial No. 722,539.

My invention belongs to that general class of devices known as packing, such as disclosed in my copending application Serial No. 722,538, filed of even date, herewith, (1,646,536) devoted to a special method of producing the packing, and relates particularly to an improved packing and a new and novel method of making the same. More particularly the same relates to a packing comprising a body made up of a tubular wear-face member of sufficient material to hold its shape and to afford a considerable wear, and as much thicker as desired, provided with a core member of a size to closely fit the tubular bore of the wear member, and preferably of elastic, resilient or equivalent material such as rubber or the like. The invention herein described also includes a method of making the same. The invention has among its objects the production of a packing of the kind described which is simple, convenient, durable, efficient, inexpensive and satisfactory for use wherever found applicable, and a simple and inexpensive method of making the same. The invention has among its further objects the production of a packing in which the core member is completely enclosed from end to end. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 11 is a sectional view illustrating the application of a modified type of core to the tube;

Fig. 12 is a sectional view of the tube and expanded core;

Fig. 13 is a cross-sectional view taken substantially on line 13—13 of Fig. 12;

Fig. 14 is a sectional view illustrating a modified construction;

Fig. 15 is a similar view after expansion of the core;

Figs. 16, 17 and 18 are sectional views illustrating modified types; and

Fig. 19 is a view illustrating the connecting up of the ends of the core of the type shown in Figs. 11 to 15.

Figure 1:
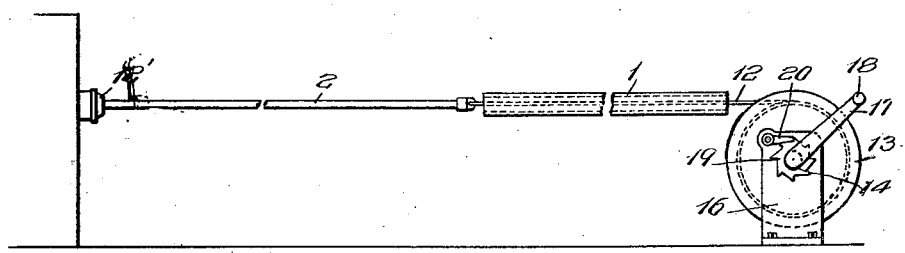
Fig. 1 is a view in elevation illustrating simple apparatus for carrying out the method herein described.

Referring to the drawings in which several embodiments of the invention are shown, it may be mentioned that in its broadest sense the packing consists of substantially two parts, one a tubular casing constituting a wear member, and a suitable core arranged to fit the interior of the wear member and of resilient or elastic material.

Figure 4:
Fig. 4 is a view in elevation of a portion of a piece of packing with a part broken away to show the construction.
Figure 5:
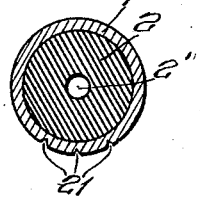
Fig. 5 is a cross-sectional view through the same.

Referring first to Figs. 4 to 10, 1 shown in Figs. 4 and 5, represents a tube or pipe of suitable material such as lead, babbitt, or a composition of materials adapted to form a suitable bearing face or a packing ring. This tubular member 1 is of the desired size and shape, the same as illustrated in Figs. 4 and 5, being cylindrical and provided with a cylindrical bore. Arranged within the part 1 is a core 2, preferably of rubber, rubber composition, or other material which has some resiliency or elasticity. This member closely fits the inner wall or the tubular bore of the tube, and generally I prefer to have the same so that it is under compression and tends to exert an expanding force against the part 1. If desired, this core may be provided with a tubular bore 2″, as shown in Fig. 5, although this is not essential, and in some instances might not be desired. The thickness of the wall of the tube 1 may be varied, depending upon the use for which the packing is to be employed, and as a matter of fact, it may vary in thickness and the side of greater thickness employed as the actual wearing face. The thickness may be said to be more or less substantial, as distinguishing between foil or very thin sheet lead or the like, and the same is an integral wall as distinguished from a built up wall wrapped or otherwise applied to a core. The metal itself forming the wearface is not elastic or resilient in the sense that the words are ordinarily used, but when the packing is made with the core as shown, the core being entirely embedded and sealed in the tube, the same is substantially resilient, elastic and flexible metallic packing. In other words, it is a metal packing that is resilient or elastic. While I generally use ductile materials such as lead or babbitt, obviously in some instances soft copper, aluminum, or other tubing suitable for the purpose might be employed.

Figure 7:
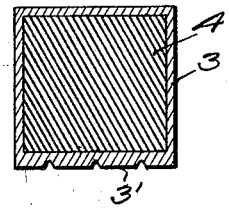
Figs. 7, 8 and 9 are similar views illustrating modified shapes of the parts.
Figure 8:
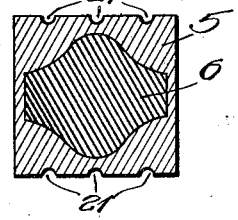
Figure 6:
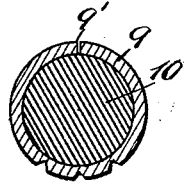
Fig. 6 is a similar view illustrating a slight variation in the outer wear member.
Figure 9:
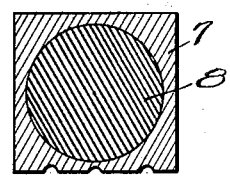

In the construction shown in Fig. 7, 3 represents the metal tube and 4 the core. In Fig. 8, 5 represents the metal tube and 6 the core, the parts in this case being of varied shape. In Fig. 9, 7 represents the metal tube and 8 the core. In Fig. 6, 9 represents the metal tube and 10 the core. In this instance, the tube 9 is formed either before or after the core is inserted, the same being sealed at 9', preferably by soldering or otherwise joining together either similar to soldering or by lock seaming. Generally, however, a tube formed as indicated in the preceding figures referred to is desired.

Figure 10:
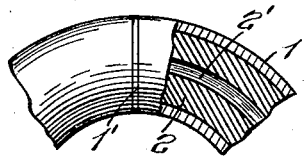
Fig. 10 is a view illustrating a portion of the packing formed to provide a ring.

In Fig. 10, I have shown a portion of a packing ring formed with a section packing similar to that shown in Fig. 4, 1 representing the tube and 2 the core. In this case, the severed ends of the packing are brought together as indicated at 1', and if desired, sealed by soldering or fusing. It should be noted, however, that in the event the same is not sealed in this or an equivalent manner so as to leave the ends of the core exposed, that there is very little space for oils or other fluids that might possibly seep in to reach the rubber, particularly if the two ends are fitted well. When the packing is compressed in the box, this has a tendency to force the ends close together, mechanically making a seal. However, if the rubber is under compression, only the extreme ends of the rubber would in any way be affected by oils or the like, consequently the ring itself would be unaffected throughout the entire length.

Figure 2:
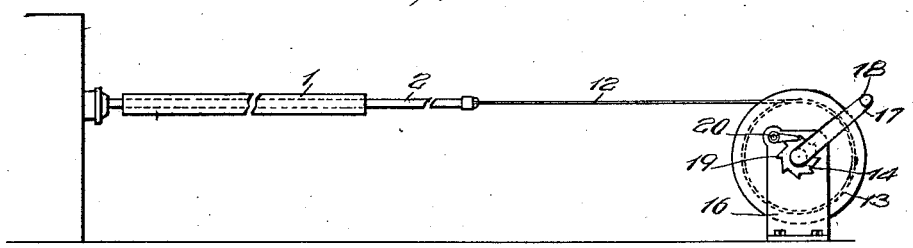
Fig. 2 is a similar view showing the parts in changed positions.
Figure 3:
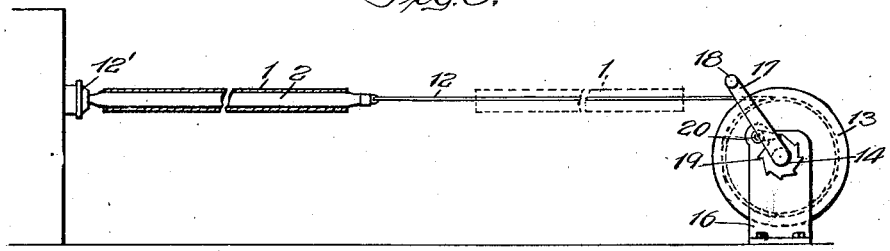
Fig. 3 is a similar view also showing further changes and steps in the method.

While the rubber core may be formed in any suitable manner and inserted in any suitable manner, or be formed directly in the tube, I have illustrated in Figs. 1, 2 and 3 a very simple method and apparatus for carrying out the method of inserting the core in a tube in such a manner that the core fits closely and also exerts an expansive force. Referring to these figures, 1 and 2 represent the tube and core respectively. 12 represents a cable such as a wire of smaller diameter than the bore of the tube 1, operatively connected with suitable winding mechanism, for example, a drum 13, the drum 13, as shown, mounted on a shaft 14 carried by a standard 16, 17 representing a crank, 19 a ratchet wheel and 20 a pawl. Turning the handle 18 tends to wind or unwind the cable 12 on the drum.

Referring to the Fig. 3, the elastic core 2 is anchored at one end as indicated at 12', and the other end secured to the cable 12 upon which is mounted the tube 1. The rubber core 2 is then stretched, as indicated in Fig. 1, by winding the cable 12 on the drum, and in stretching it decreases in diameter. After stretching, the tube 1 may then be moved back over the stretched core, the same sliding easily thereon. After the same is positioned, as indicated in Fig. 2, cable 12 is then slacked off and the core contracts in length, expanding in diameter to its original size or to the extent permitted by the tube. The same may then be removed from the apparatus and the projecting ends of the elastic core cut off. There is thus produced a strip or length of packing of the size desired. Obviously, this is but one of several ways in which the packing may be manufactured, other methods being set forth in other applications describing the method in detail.

Obviously, the packing constructed in this manner may be of any desired size and shape, and the packing may be coiled or otherwise shaped as manufactured. For example, it is obvious how the packing shown in Figs. 4 and 5 might be pressed so as to give an oval shape. In this instance, an oval shaped core might be inserted in a cylindrical or oval shaped tube. When the packing is inserted in a bearing or used as a gasket as the case might be to provide a packing, when the same is tightened down the elastic core is compressed and tends to return, exerting an internal pressure at all times on the tube. In the case of a bearing, the same provides a considerable thickness of bearing material and yet the same is substantially resilient or elastic.

I have illustrated in the Figures (see Fig. 5) how grooves 20 may be formed in the packing 1 at the exterior to form oil grooves, or these may be shaped as indicated in Fig. 8 at 21. Their depth and shape may be modified as desired, and in some cases they may be merely a plurality of depressions or pits. In Fig. 7, the bearing face is indicated at 3' and is of somewhat greater thickness than the other walls, while in Fig. 8 an increased bearing face is provided on opposite sides.

In the construction shown in Figs. 11, 12 and 13, 26 represents a tube and 27 a core having a spring 28 embedded therein. The end of the spring may be bent as indicated at 29 to form a hook, the purpose of which will be more fully explained hereinafter. In these figures, 2 represents a cable similar to that shown in Fig. 1 for stretching the core, the cable, however, being preferably attached to the core similar to that shown in Fig. 3. In this case the core may be made with the spring embedded therein, the size of the spring being as desired. After the core and spring are extended and then permitted to expand, they will fill the tube substantially as shown in Fig. 12. With this type, a hook or eye may be easily formed at each end of the core after the packing is cut to the desired ring size, and the ends of the core connected together. I have illustrated this in Fig. 19, in which the two ends are shown connected together as at 39. The tendency of the spring is to draw the parts of the packing together at the ends as shown in Fig. 10, or contract the ring on the rod. Obviously, the spring itself tends to cause the packing to closely fit the rod and to cause the ends to be sealed or be drawn together. This drawing of the packing close to the rod by the packing itself is desirable in many instances. The ring may be placed on the rod and then the ends of the core hooked or secured together and the ring then moved into the box.

In the construction shown in Figs. 14 and 15, 30 represents the tube, 31 the core and 32 a spring, but in this case rubber when it expands as shown in Fig. 15, tends to crowd in between the coils so that the coil of the spring is substantially embedded in the rubber.

In Fig. 16, 36 represents a tube of suitable size, shape and material, and 37 a core also of suitable size, shape and material. In this case, a backing 38 is provided on the tube at the exterior, this backing being of rubber or of any other material suitable for the purpose, and it may be secured to the packing tube in any satisfactory manner.

In Fig. 17, the backing 41 is shown secured to the tube 39 containing the core 40. In Fig. 18, 33 represents the tube and 34 the core, the resilient elastic or like backing 35 being secured to the tube by an interlocking joint between the two. Obviously, any equivalent securing of the parts together may be employed. These constructions are desirable in some installations, the backing giving increased resiliency.

The packing may be employed in a stuffing box through which a reciprocating rod projects or through which a rotatable rod or shaft projects, and the same may, if desired, be applied to a plunger, for example, in a pump, similar to a piston ring, and owing to the substantial body of wearing metal, the same has comparatively long life. No additional coverings such as braided or wrapped coverings are required to retain the parts assembled. Obviously, a tube with a core such as described may be bent or formed into rings without crimping or deforming the section of the packing, as is the case ordinarily with a tube without a core.

As before mentioned, the packing in operation is substantially the same as a solid packing ring in so far as durability and service are concerned, but in addition is substantially resilient or elastic in action, something that has heretofore been considered as impossible in a metal packing of substantial thickness. The forms shown in Figs. 11 to 15 have the added advantage that the core ends may be connected together as shown in Fig. 19, thereby providing packing that in itself is self-contracting. The same not only is expanded against the rod by the stuffing box nut, but tends itself to draw tight to the rod.

The wear face side may be made of a considerable thickness without impairing the efficiency of the packing, as the same will be elastic in the box and tend to closely fit both at the sides and on the wearing face. The sides, on the other hand, may be comparatively thin. It is possible to use this packing in installations where other packings could not be employed, that is to say, packings having any degree of elasticity or inherent compression and expansion characteristics. I do not wish to be understood in the claims as limiting the packing to the particular shapes shown, nor to the one method of manufacture illustrated herein.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A packing of the character described comprising a relatively thin imperforated casing of ductile metal, a core of elastic material, and a coiled spring surrounding the core, the core within the casing exerting an expansive force on the walls of the casing to normally retain the casing in its original shape but allowing the same to yield under pressure, the coiled spring being embedded in the core.

2. A packing of the character described comprising a relatively thin continuous and unbroken, pliable, inelastic casing, and a core of elastic material normally under compression and exerting an expansible force on the walls of the casing to normally retain the casing in its original shape but allowing the same to yield under pressure.

3. A packing of the character described comprising a continuous and unbroken, pliable, inelastic casing such as lead, and a solid core of elastic material such as rubber, held within the casing by the prevention of the normal expansion of the core by the confines of the casing.

In testimony whereof, I have hereunto signed my name.

NORMAN E. JOHNSON.